US007047208B1

(12) United States Patent  (10) Patent No.: US 7,047,208 B1
Nelson et al.  (45) Date of Patent: May 16, 2006

(54) SYSTEM AND METHOD FOR DETECTING SUPPLIER INSTABILITY

(75) Inventors: Robert D. Nelson, Dublin, OH (US); Bradley K. Rechel, Dublin, OH (US); Bryan K. Clay, Gahanna, OH (US)

(73) Assignee: Honda Motor Co., Ltd., Tokyo (JP)

( * ) Notice: Subject to any disclaimer, the term of this patent is extended or adjusted under 35 U.S.C. 154(b) by 988 days.

(21) Appl. No.: 09/931,396

(22) Filed: Aug. 16, 2001

(51) Int. Cl.
  *G06Q 90/00* (2006.01)
(52) U.S. Cl. ...................................................... 705/10
(58) Field of Classification Search .................... 705/10
  See application file for complete search history.

(56) References Cited

U.S. PATENT DOCUMENTS

| | | | | |
|---|---|---|---|---|
| 5,627,973 | A | * | 5/1997 | Armstrong et al. ............ 705/10 |
| 5,765,138 | A | | 6/1998 | Aycock et al. ................. 705/7 |
| 5,884,275 | A | * | 3/1999 | Peterson et al. ............... 705/7 |
| 5,983,194 | A | * | 11/1999 | Hogge et al. ................... 705/7 |
| 6,647,374 | B1 | * | 11/2003 | Kansal .......................... 705/10 |
| 6,901,426 | B1 | * | 5/2005 | Powers et al. ................ 705/11 |

FOREIGN PATENT DOCUMENTS

WO   WO-98/29822 A1 *   7/1998

OTHER PUBLICATIONS

Thierauf, Decision making through operations research, 2nd Edition, 1975, Wiley Series in Management and Administration, Chapter 1, p. 3-31 (16 pages).*

Helper, Supplier relations in Japan and the United States: are they converging?, SPRING1995, Sloan Management Review, v.36, n.3, p. 77-84 (8 pages).*

Das, Purchasing competence and its relationship with manufacturing performance, SPRING2000, Journal of Supply Chain Management, v.36, n.2, p. 17-28 (12 pages).*

Neely, Performance measurement system design, 1995, International Journal of Operations and Production Management, v.15, n.4, p. 80-116 (37 pages).*

Zsidisin, Purchasing organization involvement in risk assessments, contingencyplans, and risk management: an exploratory study, 2000, Supply Chain Management: An Internationa Journal, v. 5, n. 4, p. 187-197 (11 pages).*

(Continued)

*Primary Examiner*—Tariq R. Hafiz
*Assistant Examiner*—Tamara L. Graysay
(74) *Attorney, Agent, or Firm*—Standley Law Group LLP

(57) ABSTRACT

A system and method for detecting supplier instability is disclosed. Warning indicators such as annual warning indicators and early warning indicators are assigned values and analyzed to determine the stability of a supplier. Annual and early warning indicator values are based on supplier data related to profit, financial, quality, cost, delivery, development, management, and sensing data. As a result of the analysis of the annual warning and early warning indicator values, each supplier is assigned a supplier stability measure or level. Suppliers that are determined by the company to be unstable are guided by the company through a recovery process to restore stability. The present invention allows a company to maintain a smooth and stable supply of products, parts, or materials to its business operations.

20 Claims, 15 Drawing Sheets

WARNING INDICATOR REVIEW REPORT

| Supplier | Annual FY Rank | EARLY | | | | | | | | | Sensing |
|---|---|---|---|---|---|---|---|---|---|---|---|
| | | Financial | | Quality | | Delivery | | | NMD | Mgt | |
| | | TA | Paydex | SER | PPM | IPM | PPM | D/T | CMS | CF | LR | |
| 000100-Supplier A | | | V | | V | V | V | | X | | | Alert 57-48 |
| 000102-Supplier B | | | | X | | | V | | | | | |
| 000104-Supplier C | | X | | | | | V | | | | | Alert 46-38;D/T 3/01 |
| 000106-Supplier D | A | | | V | | | V | V | | | | D/T 2/01 |
| 000108-Supplier E | | | | | V | X | | | O | | | |
| 000110-Supplier F | | | | V | | V | X | | | | | |
| 000112-Supplier G | | | V | | | | V | | | | | |
| 000114-Supplier H | | | | | | X | X | | | | | D/T 3/01 |
| 000116-Supplier I | | | | V | V | | | | | | | |
| 000118-Supplier J | | | V | | | X | | | | | | |
| 000120-Supplier K | B | | | | | | X | V | | | | |
| 000122-Supplier L | | | | X | V | X | | | O | | | |
| 000124-Supplier M | A | | | | | X | V | O | | | | D/T 3/01 |
| 000126-Supplier N | | | | | V | V | | | | | | |
| 000128-Supplier O | | | | | V | | V | | | | | D/T 2/01 |
| 000130-Supplier P | | | | | V | V | | | | | | |
| 000132-Supplier R | | | | | X | X | | | | | | |
| 000134-Supplier S | | X | V | | | X | | | | | | Alert 49-25 |
| 000136-Supplier T | | | | | V | X | | | | | | |
| 000138-Supplier U | | | | | V | | X | | | | | |

260 262 264 266 268 270 272 274

OTHER PUBLICATIONS

Violano, The loan rangers: systems that fight bad risk, Bankers' Monthly, Jan. 1991, v.108, n.1, p. 19 (4 pages).*

Fitzgerald, Is it advantageous to outsource loan review?, Commercial Lending Review, SUMMER1994, v.9, n.3, p. 85, [online], [retrieved Dec. 2, 2005 via PROQUEST ID:7474672] (4 pages).*

* cited by examiner

| | Criteria | Calculation Formula |
|---|---|---|
| Profitability | Before Tax Profit Margin (%) | $\frac{\text{Profit Before Tax}}{\text{Total Sales}} \times 100$ |
| | Before Tax Return on Assets (%) | $\frac{\text{Profit Before Tax}}{\text{Total Sales}} \times 100$ |
| | Interest Coverage (Times) | $\frac{\text{Earning before Interest Expense \& Taxes}}{\text{Interest Expense}}$ |
| | Cash Flow (Times) | $\frac{\text{After Tax Profit + Depreciation}}{\text{Curr. Long Term Debt+Dividends+Investments}}$ |
| Financial | Customer Concentration (%) | $\frac{\text{Largest Customer Sales}}{\text{Total Sales}} \times 100$ |
| | Leverage Ratio (Times) | $\frac{\text{Total Liabilities}}{\text{Net Worth}}$ |
| | Current Ratio (Times) | $\frac{\text{Current Assets}}{\text{Current Liabilities}}$ |
| | Quick Ratio (Times) | $\frac{\text{Current Liabilites-Inventory Amount}}{\text{Current Liabilities}}$ |
| Quality | Critical Market Quality Problems | 1. Recalls<br>2. Product updates<br>3. Critical Grade A |
| | Quality Index | Monthly Average of Quality Index |
| | 2 year Trend of Ave. Q-Index (%) | $\frac{\text{Q-Index Prior Yr. Ave.-Q-Index Cur. Yr. Ave.}}{\text{Q-Index Prior Yr. Ave.}} \times 100$ |
| | 2 year Trend of Ave. Q-PPM (%) | $\frac{\text{Q-PPM Prior Yr. Ave.-Q-PPM Cur. Yr. Ave.}}{\text{Q-PPM Prior Yr. Ave.}} \times 100$ |
| | Critical Quality Problems | A-Rank Rejections |

FIG-3A

| | Criteria | Calculation Formula |
|---|---|---|
| Cost | Rejection Rate (%) | $\frac{\text{Rejection Cost}}{\text{Annual Sales}} \times 100$ |
| | Equipment Productivity (%) | $\frac{\text{Annual Sales} - \text{Purchase Parts}}{\text{Depreciation (incl. Lease)}} \times 100$ |
| | Inventory (days) | Days of finished inventory |
| | Associate Efficiency | $\frac{\text{Annual Sales} - \text{Purchase Parts}}{\text{Number of Associates}} \times 12$ |
| | New Product Target Cost (%) | $\frac{\text{Target Cost}}{\text{Actual (Quote)}} \times 100$ |
| | Cost Down (%) | Annual Cost Down percentage |
| D | Delivery PPM | Yearly Delivery PPM |
| Management | Time Lost to Accidents (%) | $\frac{\text{Annual time lost to accidents}}{\text{Annual production hours}} \times 100$ |
| | Regulatory Violations | Number of violations in the last 5 years |
| | Training | Ave. No. of training hours per associate |
| | Kaizen | Number of suggestions per associate |
| | Circle activities (%) | Participation in Circle Activities |
| | Absenteeism Rate (%) | Associate Absenteeism Rate |
| | Attrition Rate (%) | Associate Attrition Rate |
| Others | Local Content (%) | Actual Local Content |
| | | |

156 — Cost
158
160 — Management
162 — Others

FIG-3B

| Category | Definition | Action |
|---|---|---|
| STABLE — A | • Supplier's performance indicates a stable operation | • Monitor throughout the year using the early warning indicators |
| MONITOR — B | • Suppliers that require countermeasures to concern areas to improve stability | • Utilize existing initiatives to improve and countermeasure problems as needed |
| CONCERN — C | • Suppliers that require significant improvement to avoid serious concern | • Take immediate action to establish and carry out a recovery plan<br><br>Equivalent to a Level 1 or 2 Assessment |
| ALERT — D | • Suppliers that are in need of a recovery plan<br><br>--State of Serious Concern-- | • Take immediate action to establish and carry out a recovery plan or workout process<br><br>Equivalent to a Level 3 or 4 Assessment |

FIG-5

| Category | No. | EWI | Measurement | Frequency | Judgment Criteria | | |
|---|---|---|---|---|---|---|---|
| | | | | | Green | Yellow | Red |
| Financial | 1 | Aged Accounts Receivables | Accts/Rec Past Due | Monthly | On-time | ≥30 days | ≥60 days |
| | 2 | Payment History | Score (100-0) | Monthly | ≥51 | 50-41 | ≤40 |
| | 3 | Independent Evaluation Risk | Score (9-1) | Monthly | ≤6 | 7-8 | 9 |
| Quality | 4 | PPM | 3 month performance trend of rejects/million | Monthly | stable or positive | 2 of 3 mos 150≥PPM | 3M worse AND≥50 |
| | 5 | IPM | 3 month performance trend of index/million | Monthly | stable or positive | 2 of 3 mos 150≥PPM | 3M worse AND≥50 |
| | 6 | PPM | 3 month perform. trend misdeliveries/million | Monthly | stable or positive | 2 of 3 mos 600≥PPM | 3M worse AND≥200 |
| Delivery | 7 | Downtime | # supplier-caused incidents/4 months | Monthly | No incidents | ≥1 incidents prior 2 mos | Downtime last month |
| | 8 | Capacity Management System | Process Utilization Report | Monthly | No Concerns | Unconfirmed Concern | Capacity Concern |
| Development | 9 | New product Maturation | Target vs Actual (NM Evaluation) | Monthly (as available) | Met most Targets | Missed some Targets | Failed most Targets |
| Management | 10 | Labor Relations | Level of Labor Issues | Monthly | None | Concern | Unrest |
| Sensing | 11 | Observations & Requests | Based upon weekly input | Monthly | Per Review Meeting Discussion | | |

FIG-7

| Supplier Number | Data | Report Month 03/01/01 | 04/01/01 | 05/01/01 | 3 mos worsening | 2 of last 3 mos |
|---|---|---|---|---|---|---|
| 000100-Supplier A | Delivery PPM | 0 | 0 | 0 | no | no |
| | Quality PPM | 0 | 0 | 0 | no | no |
| | Quality IPM | 0 | 0 | 0 | no | no |
| 000102-Supplier B | Delivery PPM | 0 | 0 | 0 | no | no |
| | Quality PPM | 21 | 13 | 14 | no | no |
| | Quality IPM | 0 | 0 | 0 | no | no |
| 000104-Supplier C | Delivery PPM | 0 | 96 | 0 | no | no |
| | Quality PPM | 8 | 16 | 35 | no | no |
| | Quality IPM | 44 | 96 | 94 | no | no |
| 000106-Supplier D | Delivery PPM | 0 | 0 | 0 | no | no |
| | Quality PPM | 31 | 0 | 0 | no | no |
| | Quality IPM | 125 | 0 | 0 | no | no |
| 000108-Supplier E | Delivery PPM | 176 | 0 | 0 | no | no |
| | Quality PPM | 100 | 14 | 147 | no | no |
| | Quality IPM | 80 | 94 | 104 | yes | no |
| 000110-Supplier F | Delivery PPM | 0 | 0 | 0 | no | no |
| | Quality PPM | 0 | 192 | 24 | no | no |
| | Quality IPM | 0 | 257 | 96 | no | no |
| 000112-Supplier G | Delivery PPM | 103 | 0 | 2 | no | no |
| | Quality PPM | 1 | 1 | 9 | no | no |
| | Quality IPM | 5 | 5 | 35 | no | no |
| 000114-Supplier H | Delivery PPM | 0 | 7 | 0 | no | no |
| | Quality PPM | 117 | 43 | 50 | no | no |
| | Quality IPM | 119 | 213 | 146 | no | no |
| 000116-Supplier I | Delivery PPM | 0 | 0 | 602 | no | no |
| | Quality PPM | 6 | 1 | 1 | no | no |
| | Quality IPM | 14 | 2 | 6 | no | no |

FIG-9

WARNING INDICATOR REVIEW REPORT

| Supplier | Annual FY Rank | Financial | | Quality | | | Delivery | | | NMD | Mgt | Sensing |
|---|---|---|---|---|---|---|---|---|---|---|---|---|
| | | TA | Poydex | SER | PPM | IPM | PPM | D/T | CMS | CF | LR | |
| 000100-Supplier A | | | ✓ | | ✓ | ✓ | ✓ | | x | | | Alert 57-48 |
| 000102-Supplier B | | | | x | | | ✓ | | | | | |
| 000104-Supplier C | | | x | | | | | | | | | Alert 46-38;D/T 3/01 |
| 000106-Supplier D | A | | | | ✓ | | | ✓ | ✓ | | | D/T 2/01 |
| 000108-Supplier E | | | | ✓ | ✓ | ✓ | x | ✓ | o | | | |
| 000110-Supplier F | | | ✓ | | | | | x | | | | |
| 000112-Supplier G | | | ✓ | | | | ✓ | x | | | | |
| 000114-Supplier H | | | | | ✓ | ✓ | x | x | | | | D/T 3/01 |
| 000116-Supplier I | | | ✓ | | | | | | | | | |
| 000118-Supplier J | | | | | | | x | | | | | |
| 000120-Supplier K | B | | | | x | ✓ | x | x | ✓ | | | |
| 000122-Supplier L | | | | | | | x | ✓ | o | | | D/T 3/01 |
| 000124-Supplier M | A | | | | | ✓ | ✓ | ✓ | o | | | D/T 2/01 |
| 000126-Supplier N | | | | | | ✓ | ✓ | ✓ | | | | |
| 000128-Supplier O | | | | | | | | | | | | |
| 000130-Supplier P | | | | | ✓ | | | | | | | |
| 000132-Supplier R | | | | ✓ | | x | x | | | | | Alert 49-25 |
| 000134-Supplier S | | | x | x | | | x | | | | | |
| 000136-Supplier T | | | | | ✓ | x | x | | | | | |
| 000138-Supplier U | | | | ✓ | ✓ | | x | | | | | |

FIG-10

SYSTEM AND METHOD FOR DETECTING SUPPLIER INSTABILITY

FIELD OF THE INVENTION

The present invention relates to systems and methods for evaluating suppliers. In particular, the present invention relates to a system and method for detecting supplier instability so that corrective action may be taken to minimize the impact of the supplier's instability on the business.

BACKGROUND OF THE INVENTION

Purchasing departments use a variety of manual and informal methods and techniques for evaluating suppliers. Companies often evaluate suppliers based on their past performance. Companies may review such factors of past performance as the timeliness of deliveries and the quality of delivered products before deciding whether to conduct business with a particular supplier in the future. Many companies maintain preferred supplier lists based on each supplier's past performance. The suppliers on the lists are believed to have the ability deliver high quality products in a timely manner because, in the past, they have performed adequately. A company may rely on the list to select suppliers who are then asked to supply products, parts, or materials to the company.

Although purchasing departments have developed preferred supplier lists and other manual and informal techniques for selecting suppliers, these approaches are not always reliable. First, the past performance data may not be updated in a consistent manner. As a result, the purchasing department may rely on outdated data to select a supplier and make a purchasing decision. In addition, the past performance data does not provide any indication that the supplier has the ability to meet the customer's current requirements. If the purchasing department relies on outdated data that is not indicative of the supplier's current ability to perform, the company may choose suppliers that cannot meet its requirements. The supplier's inability to perform may then impact the company's business resulting in increased costs and reduced profitability to the company.

Some systems and methods for evaluating suppliers have been developed. U.S. Pat. No. 5,765,138 to Aycock discloses an apparatus and method for providing interactive evaluation of potential suppliers using quality process maturity data. The disclosed apparatus and method comprise a database with maturity requirements and recognized quality standards, and a processing system for comparing project objectives to selected standards and quality maturity requirements. The apparatus and method evaluate the processes used by a supplier to provide services such as software development services. The apparatus and method do not evaluate the stability of a supplier by analyzing the ability of a supplier to provide products, parts, or materials. In addition, the apparatus and method do not consider past performance data as well as other data that may be indicative of a supplier's ability to deliver products, parts, or materials.

The prior art does not disclose a system and method for analyzing past performance data and other data to detect supplier instability so that corrective action may be taken to minimize the impact of the supplier's instability on a business.

SUMMARY OF THE INVENTION

The present invention is an early warning system and method for analyzing past performance data and other supplier data to determine the stability of a supplier. The present invention establishes a system and method for early identification of unstable suppliers and establishes guidelines to manage unstable suppliers through a recovery process. The present invention allows a company to maintain a smooth and stable supply of products, parts, or materials to its business operations.

In the present invention, annual warning indicators and early warning indicators are assigned values and analyzed to determine the stability of a supplier. As a result of the analysis of the annual warning and early warning indicator values, each supplier may be assigned a measure or level of stability. The activities of suppliers that have been assigned a low measure or level of stability may be monitored very closely to ensure that any impact on the company's business is minimized. Representatives from the company and the unstable supplier may meet to discuss and determine corrective actions that may be taken to improve the stability of the supplier. Ultimately, the company may pursue corrective actions to protect its business interests.

BRIEF DESCRIPTION OF THE DRAWINGS

FIGS. 3A and 3B are a table detailing the criteria and formulas for annual warning indicators according to an example embodiment of the present invention;

FIG. 5 is a table detailing the definitions and actions for annual warning indicators according to an example embodiment of the present invention;

FIG. 7 is a table of early warning indicators according to an example embodiment of the present invention;

FIG. 9 is a pivot table for delivery PPM and quality PPM and IPM according to an example embodiment of the present invention;

FIG. 10 is a warning indicator review report according to an example embodiment of the present invention;

DESCRIPTION OF EXAMPLE EMBODIMENTS

In one example embodiment of the present invention described herein, the suppliers provide parts or supplies to a manufacturer. In this example embodiment, several annual warning indicators and early warning indicators are based on data that are available as a result of a special relationship between the manufacturer and suppliers. First, the suppliers belong to a trading association that purchases raw materials on behalf of the suppliers. The trading association, because of the volume of its purchases, is able to obtain more favorable pricing for raw materials than each supplier may be able to obtain on its own. Suppliers then purchase raw materials from the trading association in order to manufacture products for the manufacturer. The relationship between the trading association, manufacturer, and supplier allows the manufacturer to obtain accounts receivable and payment history data that is used in evaluating the stability of the supplier. Another assumption in this example embodiment is that the supplier is required to meet certain performance objectives or targets related to new product development when the manufacturer prepares to introduce a new product to the market. A third assumption in this example is that the manufacturer manufactures products according to production schedules that dictate when parts or supplies are needed at the manufacturer's facilities. The manufacturer shares the production schedules with suppliers so that suppliers can plan their own production to meet the requirements of the manufacturer.

Although the present invention is described in relation to an example embodiment in which suppliers sell parts or products to a manufacturing concern, it is understood that the present invention may be used to evaluate the stability of any vendor that sells products, parts, or materials to any business. For example, the present invention may be used to evaluate the stability of vendors that provide office supplies (e.g., stationery, pens, notebooks) to a service-based business (e.g., a real estate office, a physician's office, a school). Different annual warning indicators and early warning indicators may be used depending upon the types of products that are sold by the vendors and the type of business purchasing the vendor's products.

Figure 1:
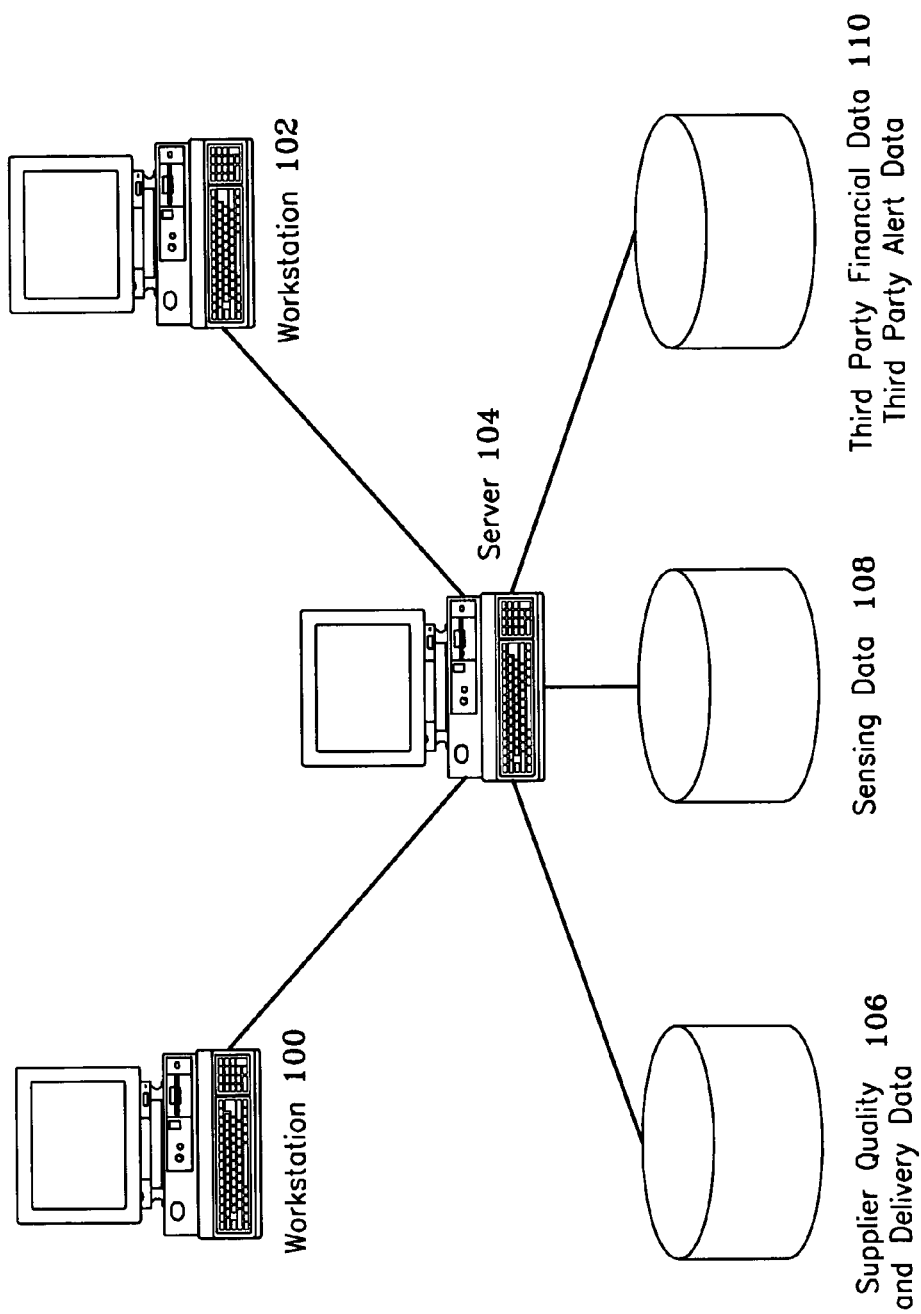
FIG. 1 is a diagram of the primary components for a system according to an example embodiment of the present invention.

Referring to FIG. 1, a diagram of the primary components for a system according to an example embodiment of the present invention is shown. The present invention analyzes and evaluates supplier data from a plurality of sources to determine a measure or level of stability for each supplier that provides products, parts, or materials to a company. Data sources may include supplier quality and delivery data 106, sensing data 108, and third party financial and alert data 110. Supplier quality data 106 may comprise data regarding defects in the products delivered by the supplier to the company. Delivery of the incorrect product or a product that does not meet the company's requirements, specifications, or standards may be considered defective and therefore, must be rejected. Supplier quality data 106 may comprise, for example, the number of products per million delivered that are considered by the company to be defective. Supplier delivery data 106 may comprise data regarding the timeliness of deliveries and may comprise, for example, the number of products per million that have been delivered late during a particular time period. The company may obtain supplier quality and delivery data by entering into a database data related to deliveries and the quality of delivered products as the products are received or consumed by the company. Expected delivery dates may be compared to actual delivery dates to determine whether the supplier has been delivering products in a timely manner. In an example embodiment of the present invention, quality and delivery data are measured in parts per million (PPM). Delivery PPM is the number of products per million delivered late. Quality PPM is the number of products per million considered defective.

Sensing data 108 may include data that the supplier provides to the company at regular intervals. The sensing data comprises data regarding the supplier's business operations such as the number of employees, employee absenteeism rates, employee retention and attrition rates, employee training data, regulatory violations over a specified period, and other information that may be analyzed to assess the stability of a supplier.

Third party financial and alert data 110 may be data related to a supplier's business operations that is obtained from a third party service such as Dun & Bradstreet's or Hoover's. Financial data may include net worth and profitability data, revenue and sales data, payment performance data, management experience data, employee data, etc. Alert data may include data related to special events such as changes in ownership or management, lawsuits, liens, or judgments, bankruptcy proceedings, UCC filings, and other operational changes. The financial and alert data 100 from the third party sources may supplement the supplier quality and delivery data 106 collected and tracked by the company and the sensing data 108.

The supplier quality and delivery data 106, sensing data 108, and third party financial and alert data 110 sources may be connected to a server 104 for processing in accordance with the present invention. Software operational at the server 104 processes the data from the various sources to determine a supplier stability measure or a supplier stability level for each supplier that sells products to the company. The supplier stability level may be determined according to warning indicators such as early warning indicators and annual warning indicators. Company employees working at workstations 100, 102 may connect to the server 104 to review and analyze the supplier stability ratings and related data processed at the server 104. For example, data from the server 104 may be downloaded to spreadsheets at the workstations 100, 102 for further processing and analysis. In addition, annual warning indicator and early warning indicator reports as well as supplier stability reports comprising stability data for a plurality of suppliers may be prepared at the workstations 100, 102.

Figure 2:
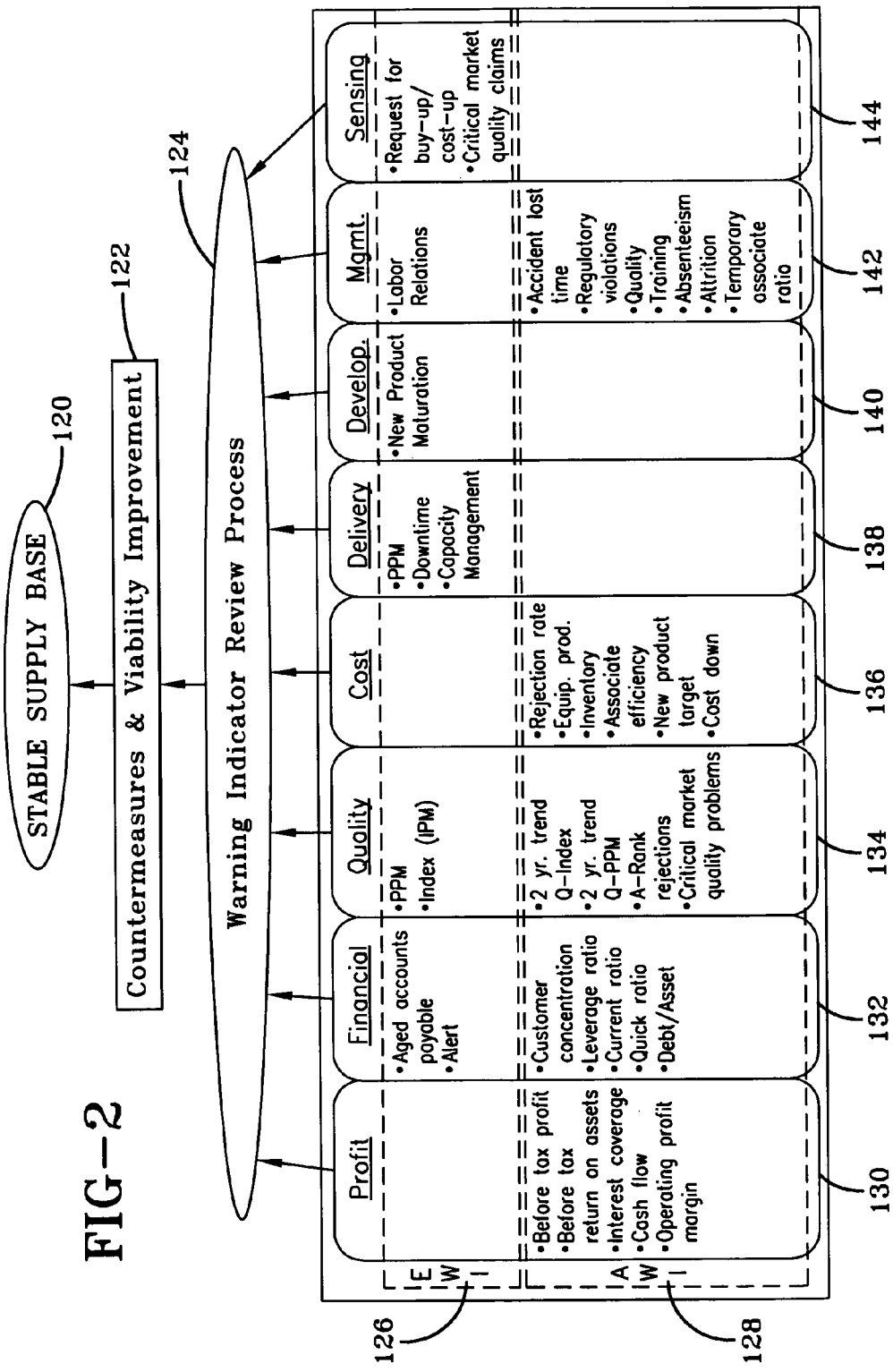
FIG. 2 is a flow diagram for detecting supplier instability according to an example embodiment of the present invention.

Referring to FIG. 2, a flow diagram for detecting supplier instability according to an example embodiment of the present invention is shown. Profit data 130, financial data 132, quality data 134, cost data 136, delivery data 138, development data 140, management data 142, and sensing data 144 are categorized as early warning indicators 126 or annual warning indicators 128. Examples of data for each of the data categories—profit data 130, financial data 132, quality data 134, cost data 136, delivery data 138, development data 140, management data 142, and sensing data 144 are shown in FIG. 2. For example, financial data may include aged accounts payable data, alert data, customer concern data, leverage, current, and quick ratio data, and debt/asset ratio data. In an example embodiment of the present invention, early warning indicators are tracked monthly. The early warning indicators (EWI) 126 and annual warning indicators (AWI) 128 serve as input to a warning indicator review process 124 in which warning indicators (annual warning indicators and early warning indicators) are analyzed to determine a measure or level of stability for a supplier. For each supplier that is determined to be unstable, countermeasures and viability improvement actions 122 are undertaken to restore the supplier's stability. The result of using the present invention is a more stable supply base 120 for the company.

Referring to FIGS. 3A and 3B, a table detailing the criteria and formulas for annual warning indicators according to an example embodiment of the present invention is shown. The criteria 164 and formulas 166 for the profitability data 150, financial data 152, and quality data 154 are shown in FIG. 3A and the cost data 156, delivery data 158, management data 160, and other data 162 are shown in FIG. 3B. Referring to FIG. 3A, profitability data 150 and financial data 152 values may be obtained by applying the appropriate formula 166 to the relevant numbers for each supplier. The numbers used for the calculations may be supplied directly by the supplier or obtained from a third party financial database.

The quality data 154 may be obtained as follows. Critical market quality problems data may be based on the number of recalls, product updates, and critical grade A problems experienced by the company in the past year. Problems with products provided by a supplier may be ranked or graded depending upon the severity of the problem. In a manufacturing environment, a critical grade A problem may be a serious problem that affects the functionality, and possibly the safety, of the manufactured product that is created using the supplier product. A grade B problem may be a problem that has only a minor impact on functionality of the product. A grade C problem may be a problem that affects the appearance, but not the functionality, of a product. For example, in an automotive manufacturing environment, a functional problem in a seat belt may be given a critical grade A ranking while a cosmetic problem in a seat fabric may be given a grade C ranking. The critical market quality problem data may then include a value for the number of critical grade A problems experienced in the last year.

The quality index is a quality measure that weights the type of quality problem that has been detected in products delivered by the supplier. As explained previously, problems may be ranked according to severity. Quality problems that result in a functionality or safety problem may be given a greater weight than quality problems that are cosmetic. For example, in an automotive manufacturing environment, a functional problem in a seat belt may be given a greater weight than a cosmetic problem in a seat fabric. The quality index may be measured as the monthly average of quality index values for the supplier.

The trend of average quality index (Q-Index) is based on the quality index average over a specified period such as two years. A two-year trend of average quality indexes may be computed as shown in FIG. 3A. The trend of average quality PPM (Q-PPM) is based on the quality PPM over a specified period such as two years. A two-year trend of average quality PPM may be computed as shown in FIG. 3A.

Referring to FIG. 3B, the cost data values 156 may be obtained as follows. The rejection rate, equipment productivity, inventory, and associate efficiency values may be obtained by applying the appropriate formula to the relevant numbers for each supplier. The numbers used for the calculations may be supplied directly by the supplier. The new product target cost may be based on a target cost and actual (quoted) cost according to the formula shown in FIG. 3B. The target cost represents a proposed cost for a part that the supplier has been asked to manufacture for a new product under development by the company. The actual (quoted) cost represents the current cost quotation proposed by the supplier in response to the company's request for the specified part. The value provides an indication of the supplier's ability to provide parts that meet the company's specifications, including cost specifications. The cost down percentage is based on cost reductions that the supplier has realized during the year.

The delivery PPM data value 158 is a measure of the number of misdelivered products (e.g., delivery of the wrong product or a defective product). As shown in FIG. 3B, it may be measured in parts per million during a specified time period (e.g., one year).

The management data values 160 may be obtained as follows. The time lost to accidents may be calculated according to the formula shown in FIG. 3B. The regulatory violations may be the number of violations that occurred during a specified time period (e.g., five years). The training values may be based on the average number of training hours that the supplier provides to each of its employee associates. The Kaizen and circle activities values relate to quality improvement efforts that may be adopted by a supplier. The Kaizen value may be the number of suggestions provided by each of the supplier's employee associates during the year. Kaizen is a well-known method for improving productivity of workers. The circle activities value may be the percentage of employee associates who participate in quality circles during the year. The absenteeism rate and attrition rate values may be percentages of associate absenteeism and attribution. The management data values 160 may be based on data supplied by the supplier on an annual basis.

Other annual warning indicator values 162 may be recorded for suppliers as well. For example, in an example embodiment of the present invention for an automobile manufacturer, the local content data value 162 may be recorded and may be based on the Environmental Protection Agency (EPA) standards or the corporate average fuel economy (CAFE) standards for determining the origin of parts used to manufacture a product and measuring the amount of local content based on the origin of the parts.

Figure 4:
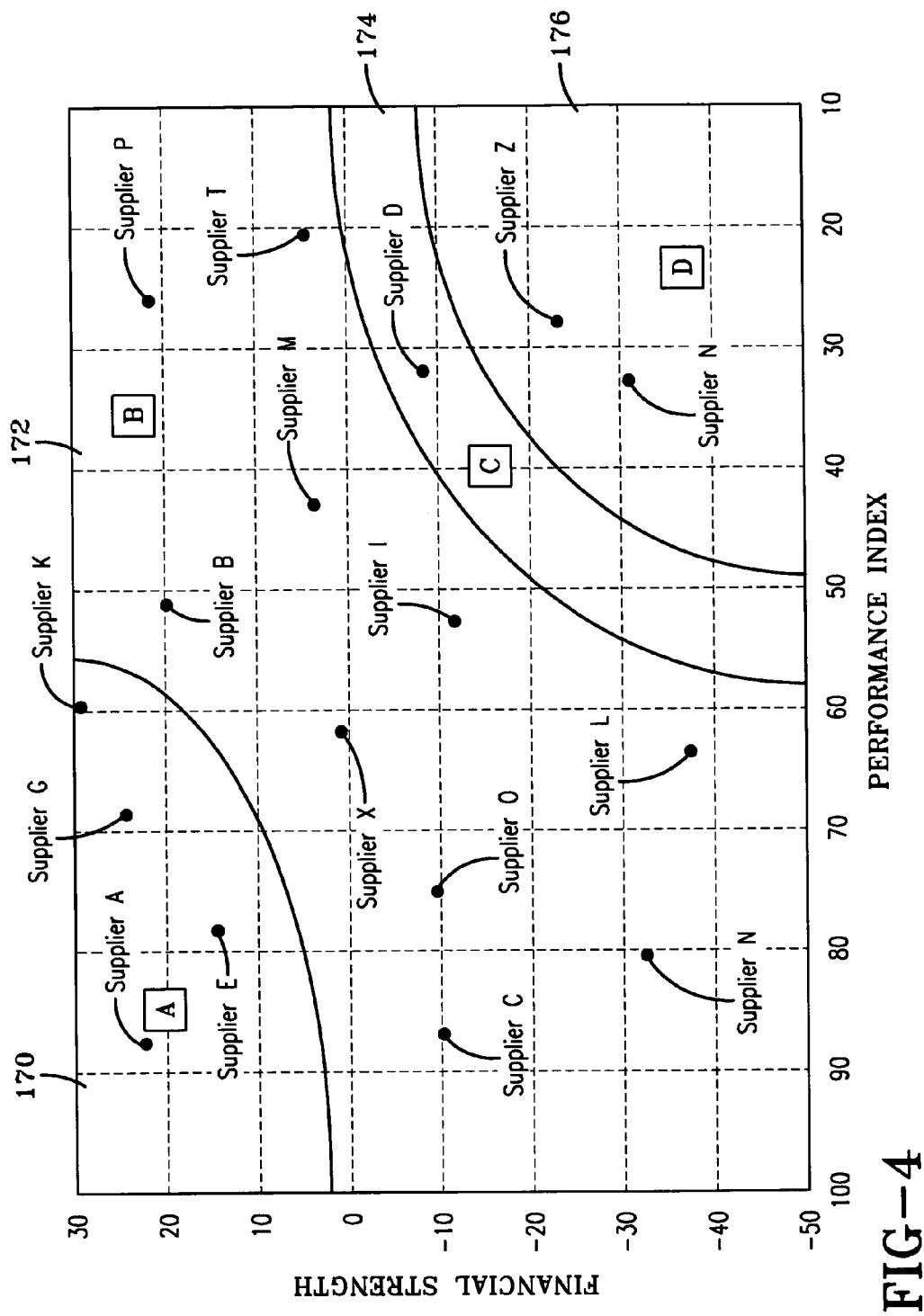
FIG. 4 is a graph of annual warning indicator values for a plurality of suppliers according to an example embodiment of the present invention.

Referring to FIG. 4, a graph of annual warning indicator values for a plurality of suppliers according to an example embodiment of the present invention is shown. As shown in FIG. 4, suppliers may be grouped in one of four categories that reflect varying levels of stability based on annual warning indicators. Suppliers in category A 170 are stable. Suppliers in category B 172 are generally stable, but require monitoring to improve stability and move into category A. Suppliers in category C 174 are unstable and require significant improvement to move to category B. Suppliers in category D 176 are highly unstable and require a recovery plan in order to meet the company's ongoing requirements. The groupings and ratings may be based on annual warning indicator values.

Referring to FIG. 5, a table detailing the definitions and actions for annual warning indicators according to an example embodiment of the present invention is shown. The definitions 190 and related actions 192 for each of the four categories of supplier stability 188 as determined by annual warning indicators is shown. In accordance with annual warning indicators, suppliers may be categorized as stable 180, requiring monitoring 182, causing serious concern 184, or on alert 186. A definition 190 is associated with each category 180, 182, 184, 186 to provide guidance regarding the stability of suppliers in the respective categories. In addition, an action 192 is associated with each category to provide guidance regarding what steps the company and supplier will need to take to increase the stability of the supplier.

Figure 6:
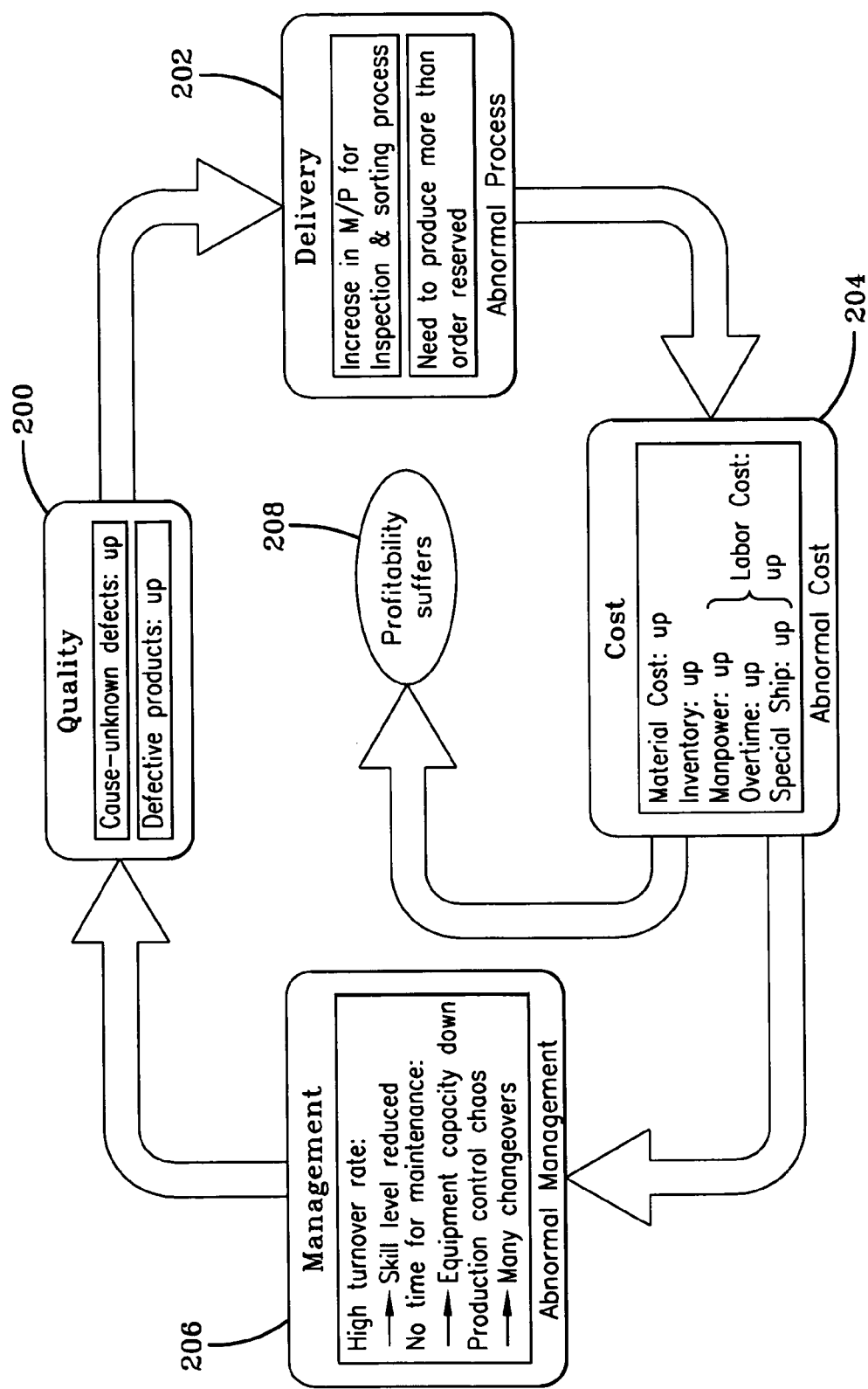
FIG. 6 is a flow diagram depicting a cycle of problems that may result in supplier instability.

Referring to FIG. 6, a flow diagram depicting a cycle of problems that may result in supplier instability is shown. The cycle comprises quality 200, delivery 202, cost 204, and management 206 problems that lead to supplier instability. Product quality 200 is an early indicator that a supplier is experiencing stability problems. The delivery of defective products—especially when the cause is unknown—is often a first indicator that the supplier is experiencing difficulties meeting its obligations to the company. Suppliers may from time-to-time deliver defective products due to extenuating circumstances. For example, if the supplier is located in an area that experiences a natural disaster, the supplier's business operations may be interrupted and as a result, the supplier may deliver defective products for a short period of time. A stable supplier may recover quickly from the disaster and resume delivery of compliant products within a few days. However, for unstable suppliers, the cause of the defective products may be difficult to determine, and the delivery of defective products may continue for an extended period of time. Quality therefore, is an important early indicator of stability. As explained previously, quality in accordance with an example embodiment of the present invention is measured as the number of products per million that is considered defective. Product defects may be discovered when products are received at the company or consumed during business operations.

Another important early indicator of supplier stability is the number of problems related to delivery 202. Once the number of defective products increases as indicated in the quality measure, the supplier may take several actions in an attempt to address the quality problems. For example, the supplier may devote additional manpower to inspect and sort the products prior to delivery. The supplier may also produce more products than have been ordered as it attempts to replace defective products. The actions taken by the supplier to address the quality 200 and delivery 202 problems often represent a change in the supplier's normal business processes that then result in increased costs 204. The increased costs 204 may cause management problems 206 such as high turnover, inability to perform equipment maintenance, and other production problems. The management problems 206 in turn result in additional quality problems 200, and the cycle of quality, delivery, cost, and management problems continues. Finally, the increased costs 208 cause a decrease in the supplier's profitability 208.

Referring to FIG. 7, a table of early warning indicators according to an example embodiment of the present invention is shown. The quality, delivery, cost, and management cycle as described in FIG. 6 may be used to determine the early warning indicators for measuring supplier stability in accordance with the present invention. As indicated in FIG. 7, early warning indicators may be organized into a plurality of categories 222—financial 210, quality 212, delivery 214, development 216, management 218, and sensing 220. Each early warning indicator may also be assigned a number 224, a short description 226, or other value or measure for the indicator 228, a frequency for obtaining a value or measure for the indicator 230, and associated judgment criteria 232. For each early warning indicator, judgment criteria 232 are used to place the supplier in one of a plurality of bands. In an example embodiment of the present invention, three bands are established using the judgment criteria. A first ("green") band corresponds to stable suppliers. A second ("yellow") band corresponds to suppliers that are experiencing stability problems. A third ("red") band corresponds to suppliers that are unstable and in need of a recovery plan.

It is understood that a larger or smaller number of bands may be established using associated judgment criteria. The judgment criteria may then be used to assign a supplier stability level.

In the financial category 210, early warning indicators may include the age of the supplier's accounts receivable 226 for the trading association. As explained previously, in an example embodiment of the present invention in which suppliers belong to a trading association, each supplier may purchase raw materials from the trading association in order to provide the manufacturer with products or parts. As a result, each supplier may have an accounts receivable with the trading association. Information regarding the accounts receivable may be used as an early warning indicator. The judgment criteria for the accounts receivables relate to the timeliness of the supplier's payments to the trading association.

The financial category 210 may also include early warning indicators for the supplier's payment history and risk evaluation 226. In an example embodiment of the present invention, the measurements are provided through third-party services that collect and evaluate financial data for thousands of companies. For example, the payment history data may be the supplier's D&B PAYDEX® score available from Dun & Bradstreet. The PAYDEX score provides an overview of how a company has been paying its bills within or beyond the agreed terms as reported to Dun & Bradstreet. The risk evaluation data may be the supplier's D&B "Supplier Evaluation Risk" (SER) score available from Dun & Bradstreet. The SER score provides an overview of how a company has been meeting its obligations to its customers. The judgment criteria for payment history and independent evaluation risk are based on the range of values assigned by the third party data provider.

The quality category 212 includes the early warning indicators quality PPM and quality index per million (IPM). The quality IPM is a quality measure that weights the type of quality problem that has been detected. Quality problems that result in a safety problem are given a greater weight than quality problems that are cosmetic. As explained previously, in an automotive manufacturing environment for example, a functional problem in a seat belt is given a greater weight than a cosmetic problem in a seat fabric. In an example embodiment of the invention, the measurements for these indicators represent three-month trends. For quality PPM, the measurement is the number of rejected or defective products per million over a three-month period. For quality IPM, the measurement is the weighted quality measure over a three-month period. The judgment criteria for the quality PPM and quality IPM are based on the values over the three-month period. For example, for the second level judgment criteria, quality PPM or IPM values above a threshold of 150 for two of three months suggest a supplier may be experiencing stability problems. For the third level judgment criteria, quality PPM or IPM values above a threshold of 50 that also increase over a three-month period suggest a supplier is experiencing serious stability problems.

The delivery category 214 includes three early warning indicators—delivery PPM, downtime, and capacity management system. The delivery PPM is a measure of the number of misdelivered products (e.g., delivery of the wrong product or a defective product) per million over a three-month period. The judgment criteria for the delivery PPM are based on the values over the three-month period. For example, for the second level judgment criteria, a delivery PPM value above a threshold of 600 for two of three months suggests a supplier may be experiencing stability problems. For the third level judgment criteria, a delivery PPM measure above a threshold of 200 that increases over a three-month period suggests a supplier is experiencing serious stability problems.

The downtime early warning indicator is a measure of the number of times that the company experienced business interruptions over a four-month period due to product quality or delivery problems caused by the supplier. For businesses that do not maintain a large inventory of products or supplies, a supplier's failure to deliver the appropriate product in a timely manner may result in interruptions to the business' operations. For example, in a manufacturing environment, work on an assembly line may stop until the correct parts are delivered to the assembly line. The judgment criteria for the downtime value are based on the number of incidents that occurred during the four-month period. In an example embodiment of the present invention, for the second level judgment criteria, one or more incidents in the three months prior to the current month suggest a supplier may be experiencing stability problems. For the third level judgment criteria, one or more incidents in the prior month suggest a supplier is experiencing serious stability problems.

The capacity management system early warning indicator is a measure of the supplier's ability to meet the company's product requirements based on known product usage or a production schedule. Bottlenecks in the supplier's production and delivery processes are identified and recorded. For example, in an automotive manufacturing environment, a steering wheel supplier may have the capacity to produce 1000 steering wheels per day for Model A and 500 steering wheels per day for Model B. If the manufacturer produces 1000 Model A cars and 500 Model B cars per day, the supplier has the capacity to meet the manufacturer's steering wheel requirements on a daily basis. However, if the automobile manufacturer decides to change its production schedule to produce 1500 Model A cars per day and the supplier has the capacity to produce only 1000 Model A steering wheels each day, the supplier will need to change its production or take other actions to meet the manufacturer's steering wheel requirements. For example, the supplier may purchase additional machinery to increase its capacity to produce Model A steering wheels. Alternatively, the supplier may agree to increase production of the Model A steering wheels and inventory them in preparation for the date when the production schedule changes. The judgment criteria for the capacity management system value are based on whether capacity concerns have been identified.

The development category 216 includes a new product maturation early warning indicator 226. For manufacturers that periodically introduce new products to the market (such as automobile manufacturers), suppliers may be required to meet certain performance objectives or targets related to new product development as the manufacturer prepares to introduce a new product to the market. The new product maturation early warning indicator is a measure of the supplier's ability to meet the specific performance targets that have been established for the supplier. The judgment criteria for the new product maturation are based on the number of targets that the supplier met or missed. Suppliers that miss some or all of the targets may be experiencing stability problems.

The management category 218 includes a labor relations early warning indicator 226. The measurement relates to the level of labor relations issues at the supplier's facility. For example, claims of unfair labor practices against the supplier or other labor unrest are indicators of instability.

The sensing category 220 includes an early warning indicator based on observations and reports. Certain actions taken by the supplier may be indicative of stability problems. In a manufacturing environment, examples include the following: a request to the company to buy-up tooling on the supplier's behalf, a request to increase prices to the company, a lack of participation in cost-reduction discussions, merger or acquisition activity, inquiries from banks, management changes, labor relations problems, attrition and absenteeism rate increases, temporary associate to permanent employee ratio increases, negative trends or spikes in delivery performance, unusual capacity concerns, negative trends in quality and delivery, and operational instability observed during supplier visits. Company representatives from purchasing, accounting, parts delivery or quality, new product development, or any other department that has interaction or communication with suppliers may submit the observations and reports. In an example embodiment of the present invention, many company representatives are asked to provide sensing data to the supplier stability monitoring process so that relevant data from many sources is recorded for further analysis. The sensing category may also be based on alert information received from third party sources. For example, if a third party report indicates a supplier is in involved in bankruptcy proceedings, this alert information may be recorded in the sensing category. The judgment criteria are the specific observations or reports provided by representatives of the company.

Different early warning indicators may be selected based on the type of business that is using the system and method of the present invention. For example, in a non-manufacturing environment, a company may eliminate use of the capacity management system and new product maturation indicators because they are not relevant to the company's business operations. A company that relies on a vendor to provide specific services may instead consider the vendor's turnaround time for providing the requested service. Turnaround time may then be used as an early warning indicator.

Figure 8:
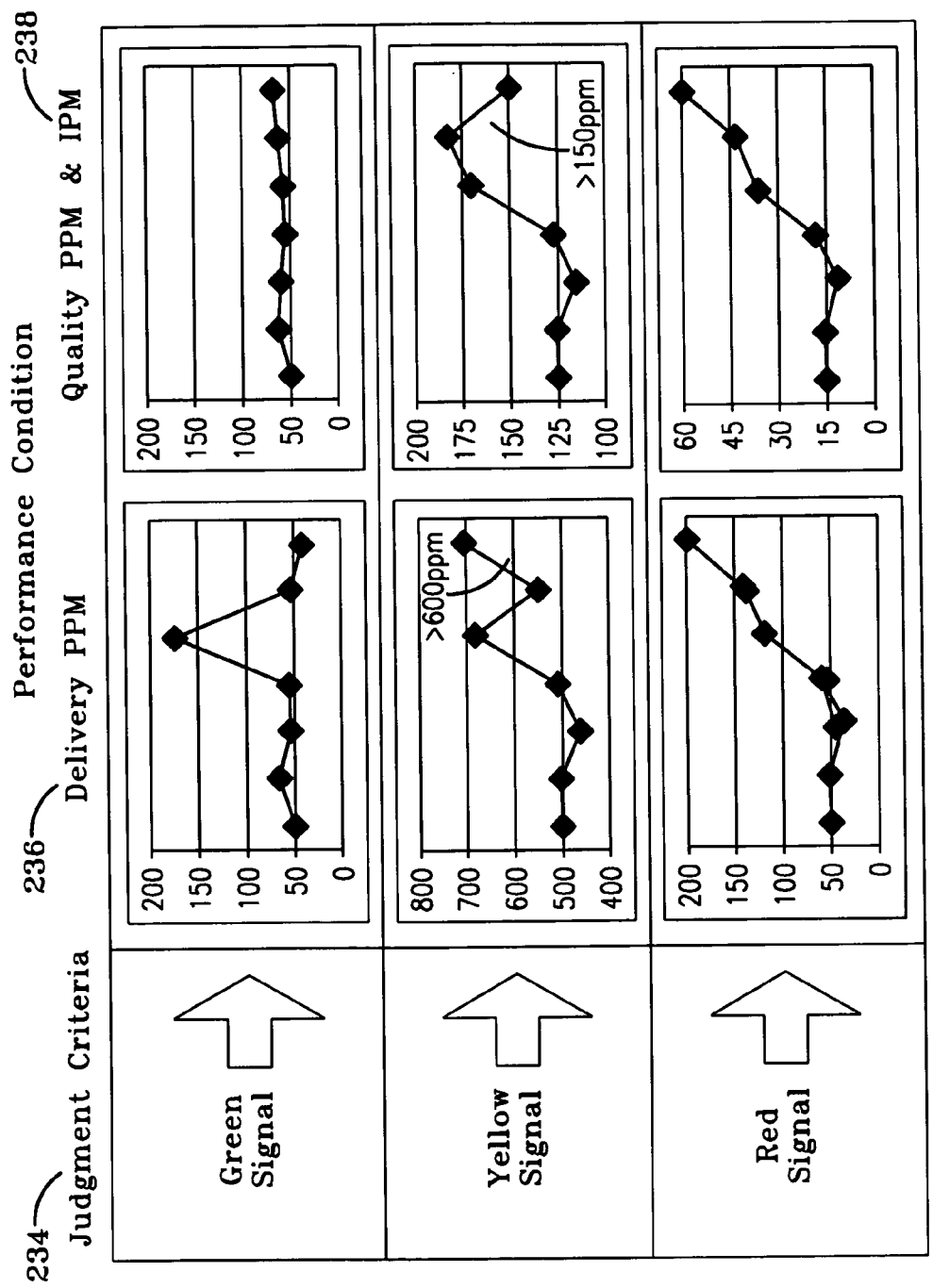
FIG. 8 has sample graphs of delivery PPM and quality PPM and IPM over a seven-month period according to an example embodiment of the present invention.

Referring to FIG. 8, sample graphs of delivery PPM and quality PPM and IPM over a seven-month period according to an example embodiment of the present invention are shown. A graph for delivery PPM 236 and quality PPM and IPM 238 in accordance with judgment criteria 234 for three levels of stability is shown. For the first level of stability (green signal—stable supplier), the delivery PPM and quality PPM and IPM measures are around 50 for every month with one exception. Delivery PPM for the fifth month is over 150. However, the judgment criteria 234 are based on a three-month period. A supplier is not included in one of the other levels unless the delivery PPM and quality PPM and IPM exceed a threshold value for two of three months or the delivery PPM and quality PPM and IPM values increase every month for three or more months. For the second level of stability (yellow signal—supplier experiencing instability), the delivery PPM exceeds 600 for two of the three preceding months. In addition, the quality PPM and IPM exceed 150 for two of the three preceding months. In accordance with an example embodiment of the present invention, these early warning indicators suggest the supplier is experiencing stability problems. For the third level of stability (red signal—supplier unstable), the delivery PPM exceeds 50 and has increased in each of the three preceding months. In addition, the quality PPM and IPM exceed 50 and have increased in each of the three preceding months. In accordance with an example embodiment of the present invention, these early warning indicators suggest the supplier is experiencing serious stability problems.

Referring to FIG. 9, a pivot table for delivery PPM and quality PPM and IPM according to an example embodiment of the present invention is shown. In the table, the following information is recorded for each supplier that provides products to the company: supplier number and name 240; delivery PPM, quality PPM and IPM labels 242; monthly delivery PPM, quality PPM and IPM values 244, 246, 248; a yes/no indicator of whether delivery PPM and quality PPM and IPM have exceeded 50 and have increased in each of the three preceding months 250; and an indicator of whether the delivery PPM and the quality PPM and IPM have exceeded 150 for two of the three preceding months 252. The delivery PPM and the quality PPM and IPM may be computed from supplier quality and delivery data collected and stored in a supplier quality and delivery database when products are received or consumed by the company. The data from the pivot table may be used as input to an early warning indicator report for each supplier.

Referring to FIG. 10, a warning indicator review report according to an example embodiment of the present invention is shown. The report comprises an entry for each supplier 260 and an associated ranking based on annual warning indicators 262, early warning indicators, and an overall supplier stability level based on an analysis of the annual warning indicator rank 262 and early warning indicators 264, 266, 268, 270, 272. In accordance with an example embodiment of the present invention, the annual warning indicator rank corresponds to categories of A (stable), B (generally stable), C (unstable), and D (highly unstable) which are assigned in accordance with an analysis of the annual warning indicators. The early warning indicators comprise financial indicators 264, quality indicators 266, delivery indicators 268, new product development indicators 270, management indicators 272, and sensing indicators 274. In accordance with an example embodiment of the present invention, the early warning indicator value for each cell corresponds to one of three levels. A blank cell or a "O" appearing in a cell indicates that the early warning indicator value is within an acceptable range. A "V" appearing in a cell indicates that the early warning indicator value is within a range suggesting the supplier may be experiencing instability. An "X" appearing in a cell indicates that the early warning indicator value is within a range suggesting the supplier is experiencing significant instability. When preparing reports, colored cells, in addition to symbols appearing in cells, may be used to indicate visually the value of the early warning indicator. For example, "O" may correspond to the color green, "V" to the color yellow, and "X" to the color "red." The stability level 276 assigned to a supplier may be based on an analysis of the annual warning indicator rank 262 and/or early warning indicators 264, 266, 268, 270, 272, 274. In accordance with an example embodiment of the present invention, one of four levels may be assigned to a supplier. Suppliers that are not exhibiting stability problems based on the warning indicators are not assigned a level. Suppliers with a few warning indicators in the unstable range may be assigned a level 1. As the number and severity of the warning indicators increases, suppliers are assigned to level 2, 3, or 4 where 4 indicates a supplier at risk that is experiencing severe stability problems.

Figure 11:
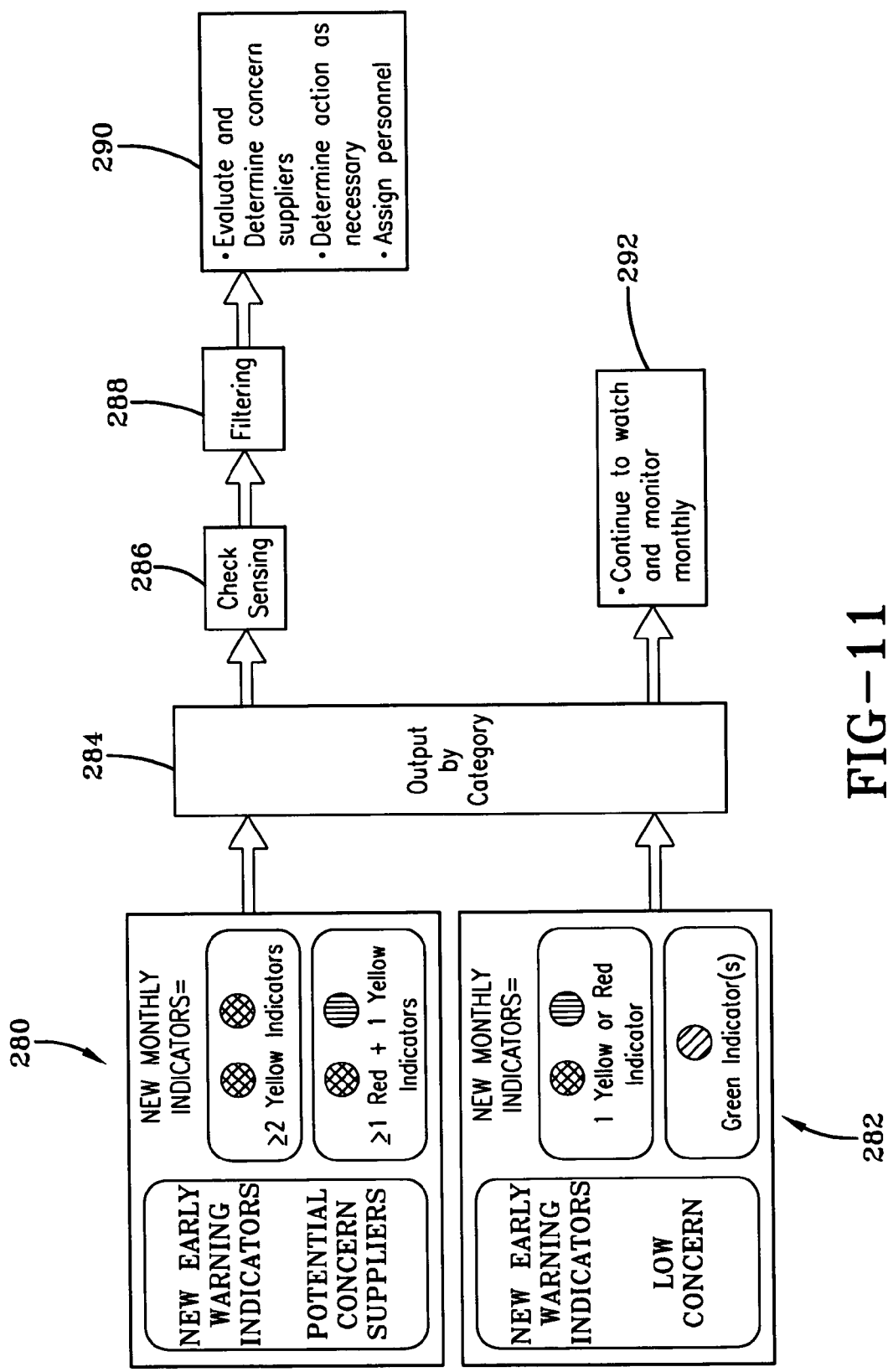
FIG. 11 is a flow chart of the process for reviewing and responding to early warning indicators according to an example embodiment of the present invention.

Referring to FIG. 11, a flow chart of the process for reviewing and responding to early warning indicators according to an example embodiment of the present invention is shown. In an example embodiment of the present invention, warning indicator review reports as described in FIG. 10 are reviewed monthly. Each month, indicators on a supplier's report are reviewed to determine whether a supplier should be monitored or whether countermeasures or a recovery plan should be adopted. As shown in FIG. 10, suppliers with new monthly indicators 280 in which two or more are "V" or "yellow" or in which one or more is "X" or "red" and one is "V" or "yellow" may be categorized 284 as "potential concern suppliers." In the next step 286, the company checks the sensing values 286 that have been identified by the early warning indicators. The sensing early warning indicator values are filtered in the next step 288 to determine the severity of the problems that the supplier is experiencing. In the next step 290, the sensing values and other early warning indicators are evaluated to determine whether the supplier should be categorized as a "potential concern supplier." In addition, the company determines what follow up action is necessary. Finally, a company representative may be assigned to track the supplier's activities and stability in order to minimize the impact of the supplier's instability on the company.

As shown in FIG. 11, suppliers with new monthly indicators 282 in which one indicator is "V"/"yellow" or "X"/"red" and the other are "O"/"green" or in which all indicators are "O"/"green" are identified 284 as "low concern suppliers." In the next step 292, the company continues to watch and monitor the suppliers' warning indicators on a monthly basis. If the monthly indicators change as explained previously, the supplier may be moved from a "low concern" category to a "potential concern" category.

Figure 12A:
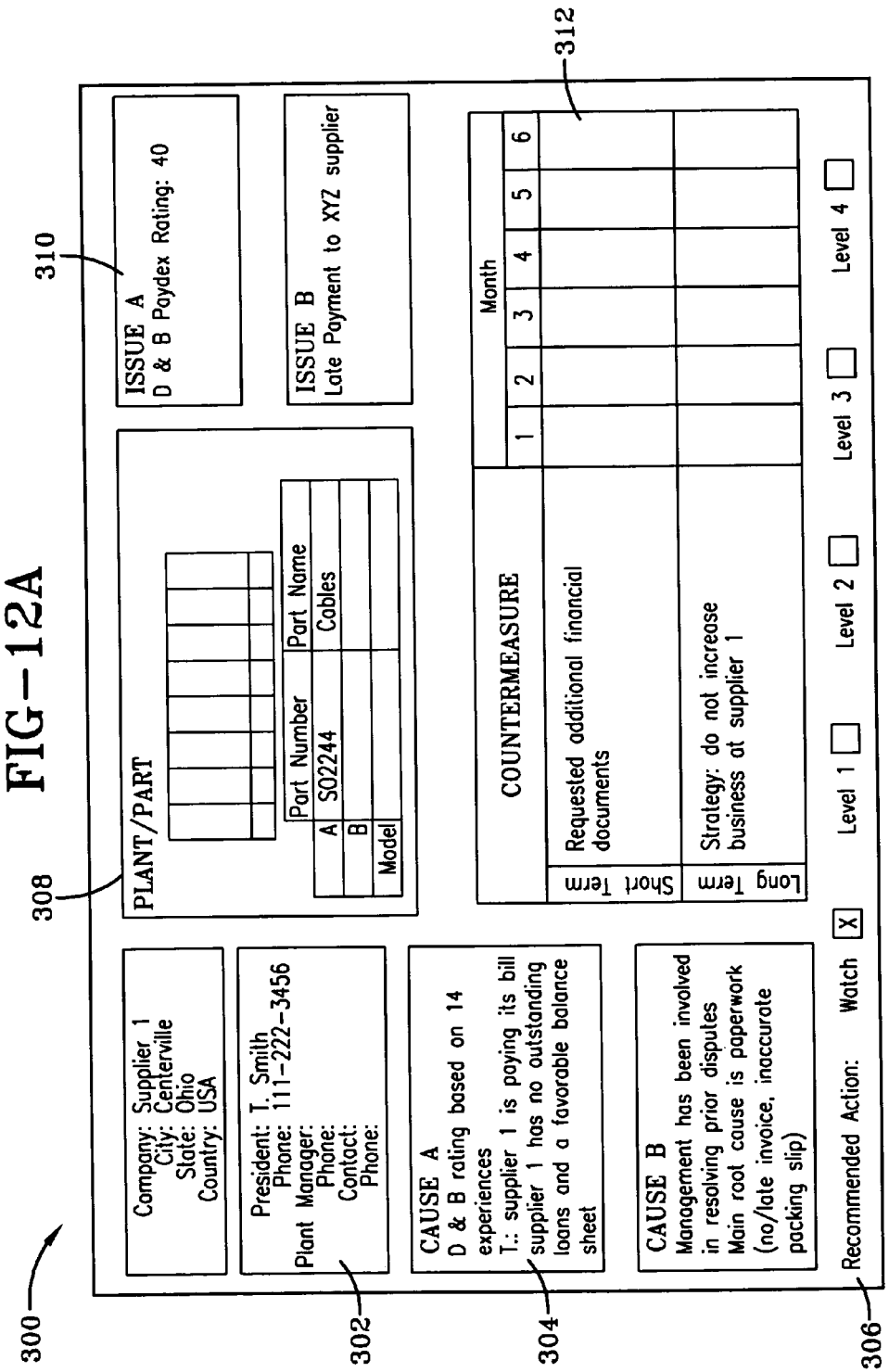
FIGS. 12A and 12B are sample reports for recording and tracking supplier stability problems according to an example embodiment of the present invention.
Figure 12B:
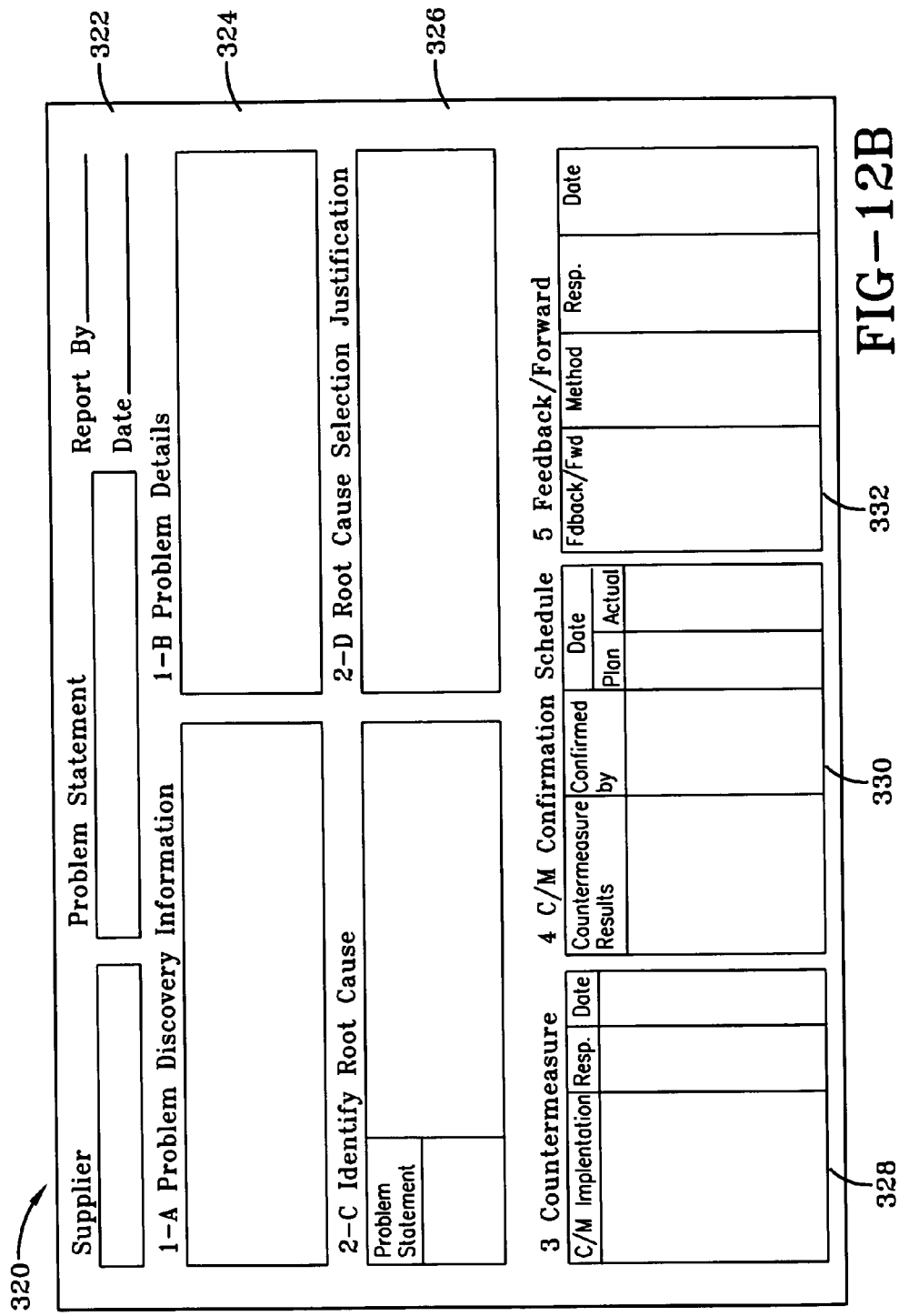

Once a company has identified the suppliers that are experiencing severe or significant stability problems (e.g., by first identifying the suppliers as "potential concern suppliers"), a company may institute countermeasures and recovery plans in order to minimize the impact of the supplier's stability problems on the company. Referring to FIGS. 12A and 12B, sample reports for recording and tracking supplier stability problems according to an example embodiment of the present invention are shown. As shown in FIG. 12A, an early warning indicator assessment report 300 may comprise contact information for the supplier 302, identifying information for a product or part 308 that the supplier provides to the company, issue information section 310 for reporting information about specific early warning indicators, cause information section 304 for reporting information about possible causes of the supplier stability problems identified by the early warning indicators (e.g., cause A may relate to issue A and cause B may relate to issue B), a countermeasure section 312 for recording information about short term and long term countermeasures taken by the company to address the supplier's stability problems, and a recommended action section 306 for recording the supplier's current supplier stability level. In the example report of FIG. 12A, a supplier may be assigned to one of four levels or may be assigned a "watch" value. The watch value may be assigned if it appears the supplier is experiencing minor stability problems. The level 4 value may be assigned if the supplier is experiencing a very high level of instability.

As shown in FIG. 12B, a problem tracking report 320 may be used to track specific problems identified in the early warning indicator assessment report 300. It may comprise a supplier identifier, problem statement, and contact information for the report preparer 322. The problem tracking report may further comprise problem discovery information and problem details 324. In addition, root cause and root cause selection justification information 326 may be recorded. The countermeasure section 328 and countermeasure (C/M) confirmation schedule 330 may be used to track information regarding countermeasures adopted by the company to minimize the impact of the supplier's instability on the company.

Finally, the feedback/forward section 332 may be used to record information regarding the supplier's responses to the actions taken by the company to restore the supplier's stability. The report may be used to assess the effectiveness of the actions that have been taken to counteract the supplier's instability.

Figure 13:
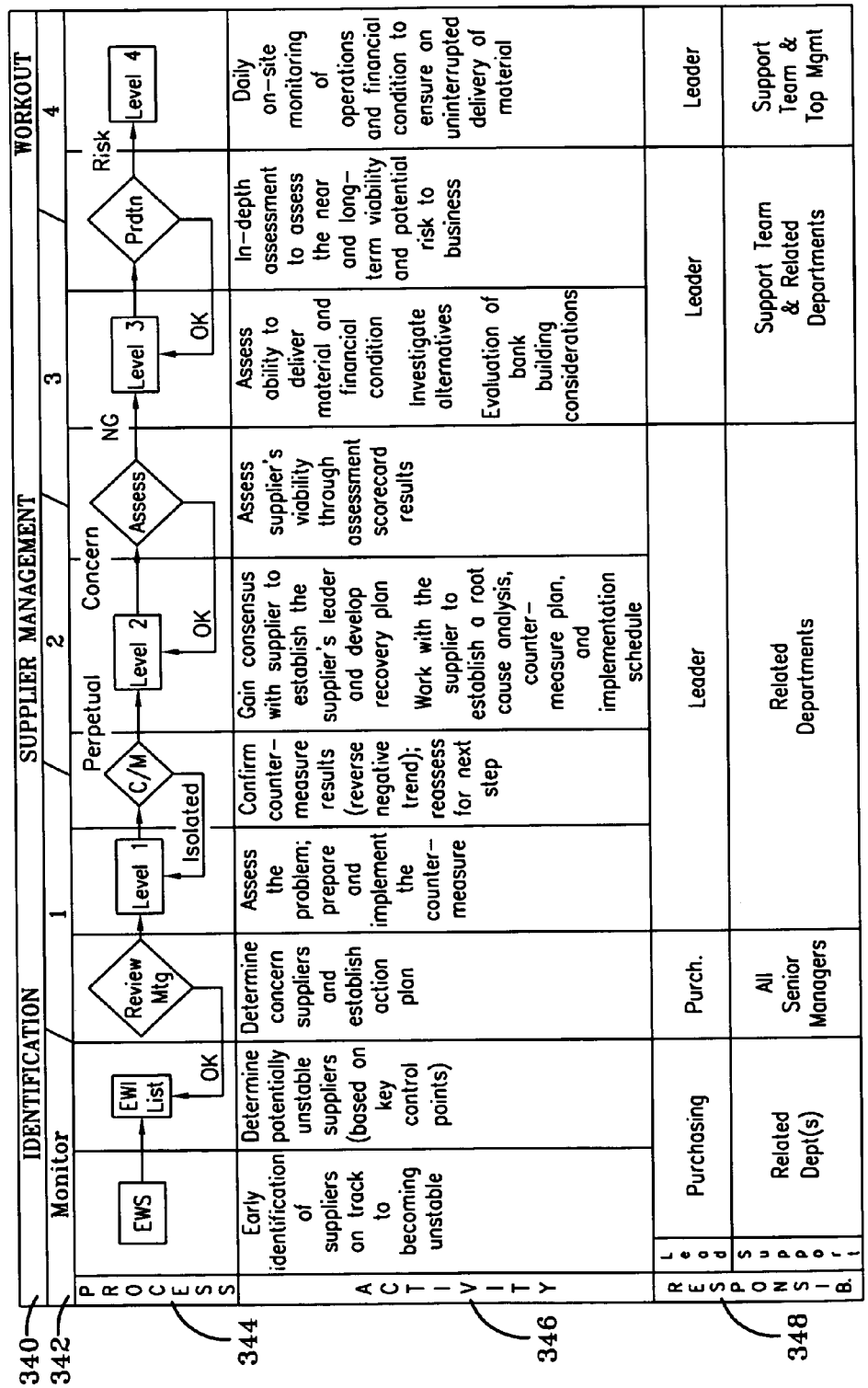
FIG. 13 is a flow diagram of the process for monitoring supplier stability data according to an example embodiment of the present invention.

Referring to FIG. 13, a flow diagram of the process for monitoring supplier stability data according to an example embodiment of the present invention is shown. The supplier stability monitoring process 340 comprises the steps of recording and reviewing warning indicators for each supplier, determining potentially unstable suppliers, filtering and determining potential concern suppliers based on the warning indicators, and establishing an action plan for the potential concern suppliers. For suppliers with level 1 instability, the next steps are to assess the problems of the unstable suppliers and implement countermeasures, and confirm the countermeasure results. If the stability problems are corrected, the supplier instability may have resulted from an isolated problem. For suppliers with perpetual problems and that reach level 2 instability, the next steps are to work with the suppliers to establish recovery plans and to establish a root cause analysis, countermeasure plan, and implementation schedule. In addition, the supplier's viability is assessed. For suppliers with potential concern and that reach level 3 instability, steps are taken to assess the supplier's ability to deliver products and the supplier's financial condition. In addition, the company may consider taking steps to build an inventory of the supplier's products to reduce the negative impact of the supplier's instability on the company. In addition, the company completes an in-depth assessment of the near and long-term viability of the supplier as well as the potential risk to the business. For suppliers that reach level 4 instability, the company may undertake steps to monitor the supplier's business operation on a daily basis and to monitor the supplier's financial condition to ensure an uninterrupted supply of products.

As indicated in FIG. 13, the steps of the monitoring process correspond to the supplier's stability level as determined using warning indicators 342 that may comprise annual warning indicators, early warning indicators, or a combination of annual and early warning indicators. In an example embodiment of the present invention, the supplier's level is determined by an annual warning indicator rank and early warning indicators. For the various stages, the process 344 comprises activities 346 that may be performed by various company employees 348. It is understood that responsibilities may be divided among and between company employees in a variety of ways and that the division of responsibilities as shown in FIG. 13 is exemplary of one way in which responsibilities may be divided.

INDUSTRIAL APPLICABILITY

The present invention is a system and method for analyzing warning indicators such as annual warning indicators and early warning indicators to determine the stability of a supplier. The system and method of the present invention support the early identification of unstable suppliers so that a company can manage unstable suppliers through a recovery process. The present invention allows a company to maintain a smooth and stable supply of products, parts, or materials to its business operations.

While example embodiments of the invention have been illustrated and described, various modifications and combinations can be made without departing from the spirit and scope of the invention. For example, a company may select different annual warning indicators and/or early warning indicators depending upon the type of products or services it provides as well as the types of products or services sold by the supplier. Modifications, combinations, and equivalents to the system and method of the present invention are intended to be covered and claimed.

What is claimed is:

1. A computerized system for analyzing data for a supplier that provides products to a manufacturing company to evaluate the stability of said supplier comprising:
   a first database comprising supplier performance data for said supplier, said supplier performance data related to said manufacturing company's purchase of products from said supplier;
   a second database comprising supplier provided business operation data, said supplier provided business operation data comprising data regarding said supplier's business operations provided by said supplier to said manufacturing company at said manufacturing company's request;
   a third database comprising third party financial and alert data, said third party financial and alert data comprising data related to said supplier's business operations obtained from at least one third-party service that collects and evaluates data for a plurality of companies;
   a computer with software for
   (a) defining a plurality of warning indicators related to said supplier's business wherein a plurality of value ranges is associated with each of said plurality of warning indicators, each of said plurality of value ranges corresponding to an acceptability level;
   (b) analyzing said supplier performance data, said supplier provided business operation data, and said third-party financial and alert data to assign a value to each of said plurality of warning indicators;
   (c) assigning an acceptability level to each of said plurality of warning indicators wherein said acceptability level is determined according said value assigned to each of said plurality of warning indicators and said value range for said each of said plurality of warning indicators; and
   (d) assigning a stability level to said supplier according to said acceptability level for each of said plurality of warning indicators wherein said stability level relates to said supplier's ability to continue providing products to said manufacturing company.

2. The system of claim 1 wherein warning indicators comprise early warning indicators.

3. The system of claim 2 wherein said early warning indicators comprise financial, quality, delivery, new product development, management, and sensing indicators.

4. The system of claim 3 wherein said supplier stability level is assigned according to judgment criteria for each of said plurality of early warning indicators.

5. The system of claim 2 further comprising annual warning indicators.

6. The system of claim 5 wherein said annual warning indicators comprise profitability, financial, quality, cost, delivery, and management indictors.

7. The system of claim 1 wherein said computer software for (e) preparing an early warning indicator assessment report and a problem tracking report.

8. A computerized method for analyzing data for a supplier that provides products to a manufacturing company to evaluate the stability of said supplier comprising:
   defining a plurality of early warning indicators related to said supplier's business;

defining a plurality of annual warning indicators related to said supplier's business;

entering into a database supplier performance data for said supplier, said supplier performance data related to said manufacturing company's purchase of products from said supplier;

entering into said database supplier provided business operation data for said supplier, said supplier provided business operation data comprising data regarding said supplier's business operations provided by said supplier to said manufacturing company at said manufacturing company's request;

entering into said database third-party financial and alert data for said supplier, said third-party financial and alert data comprising data related to said supplier's business operations obtained from at least one third-party service that collects and evaluates data for a plurality of companies assigning early warning indicator values to each of said plurality of early warning indicators for said supplier, said early warning indicator values determined according to said supplier performance data, said supplier provided business operation data, or said third-party financial and alert data for said supplier;

applying judgment criteria to each of said early warning indicator values to assign each of said early warning indicators to one of a plurality of bands;

assigning annual warning indicator values to each of said Plurality of annual warning indicators for said supplier, said annual warning indicator values determined according to said supplier performance data, said supplier provided business operation data, or said third-party financial and alert data for said supplier;

applying judgment criteria to each of said annual warning indicator values to assign a stability level to each of said annual warning indicator; and evaluating said early warning indicators and said annual warning indicators to assign an overall supplier stability level to said supplier wherein said overall supplier stability level relates to said supplier's ability to continue providing products to said manufacturing company.

9. The method of claim 8 wherein assigning early warning indicator values comprises assigning a value to financial, quality, delivery, new product development, management, and sensing indicators.

10. The method of claim 8 wherein evaluating said judgment criteria to assign a supplier overall stability level to said supplier comprises evaluating the number of new early warning indicators in each of said plurality of bands.

11. The method of claim 10 further comprising monitoring said supplier according to said supplier's overall stability level.

12. The method of claim 8 further comprising developing a recovery plan for said supplier if said supplier overall stability level indicates severe instability.

13. The method of claim 8 wherein assigning early warning indicator values to a plurality of early warning indicators for a supplier comprises assigning said early warning indicators monthly.

14. A computerized method for analyzing data for a supplier that provides products to a manufacturing company to evaluate the stability of said supplier comprising:

defining in a computer a plurality of warning indicators related to said supplier's business;

defining in said computer a plurality of value ranges of for each of said plurality of warning indicators wherein each of said plurality of value ranges corresponds to an acceptability level of values for said warning indicator;

entering into a database supplier performance data for said supplier, said supplier performance data related to said manufacturing company's purchases of products from said supplier;

entering into said database supplier provided business operation data for said supplier, said supplier provided business operation data comprising data regarding said supplier's business operations provided by said supplier to said manufacturing company at said manufacturing company's request;

entering into said database third-party financial and alert data for said supplier, said third-party financial and alert data comprising data related to said supplier's business operations obtained from at least one third-party service that collects and evaluates data for a plurality of companies;

analyzing at said computer said supplier performance data, said supplier provided business operation data, and said third-party financial and alert data to assign a value to each of said plurality of warning indicators;

assigning an acceptability level to each of said plurality of warning indicators wherein said acceptability level is determined according said value assigned to each of said plurality of warning indicators and said value range for said each of said plurality of warning indicators; and assigning a stability level to said supplier according to said acceptability level for each of said plurality of warning indicators wherein said stability level relates to said supplier's ability to continue providing products to said manufacturing company.

15. The method of claim 14 wherein said warning indicators comprise early warning indicators and annual warning indicators.

16. The method of claim 15 wherein said early warning indicators comprise financial, quality, delivery, new product development, management, and sensing indicators.

17. The method of claim 15 wherein said annual warning indicators comprise profitability, financial, quality, cost, delivery, and management indictors.

18. The method of claim 14 wherein said supplier performance data comprises data selected from the group consisting of quality data, delivery data, trading association accounts receivable data, trading association payment history data.

19. The method of claim 14 wherein said supplier provided business operation data comprises data selected from the group consisting of employee retention and attrition rates, employee absenteeism rates, and regulatory violations.

20. The method of claim 14 wherein said third-party financial and alert data comprises data selected from the group consisting of net worth and profitability data, revenue and sales data, payment performance data, management experience data, changes in ownership data, changes in management data, and lawsuit, lien, judgment and bankruptcy data.

* * * * *